May 7, 1957   N. F. PRESCOTT   2,791,395
PLUG VALVE
Filed Nov. 24, 1954

INVENTOR.
NORMAN F. PRESCOTT
BY
ATTORNEYS

United States Patent Office 2,791,395
Patented May 7, 1957

2,791,395

PLUG VALVE

Norman F. Prescott, Wenham, Mass., assignor to Atwood & Morrill Company, Salem, Mass., a corporation of Massachusetts Application November 24, 1954, Serial No. 470,873

5 Claims. (Cl. 251—162)

This invention relates to plug valves of the non-lubricated type, wherein the valve is unseated, rotated and reseated. Numerous mechanisms for accomplishing this mode of operation have been suggested, but they are subject to certain objections in that they involve relatively complicated and expensive operating parts, or where a relatively simple operating mechanism is employed, undue strains are imposed on the operating parts which ultimately cause a failure. In some cases two operating levers are employed, one for raising and lowering the valve and the other for rotating it, but such constructions are considered undesirable from a practical standpoint, as are also those constructions which involve a reverse movement of the operating handle in order to effect the reseating of the valve.

The principal objects of the present invention are to overcome the aforementioned deficiencies and to provide a rugged, reliable valve having a relatively few parts which may be economically manufactured and readily assembled.

Further objects relate to various features of construction and will be apparent from a consideration of the following description and the accompanying drawings, wherein.

Figure 1:
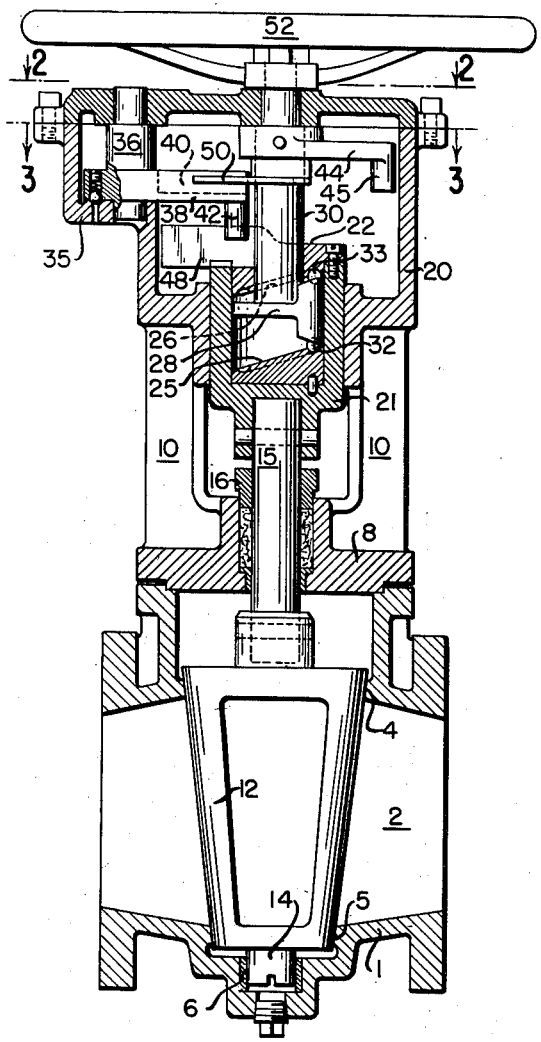
Fig. 1 is a vertical section through a plug valve constructed in accordance with the present invention.

The particular embodiment herein shown for the purposes of illustration comprises a valve body 1 formed with a passageway 2 and a frusto-conical shape cavity having valve seats 4 and 5 and a guide sleeve 6, all of which may be of conventional design and construction. A bonnet 8 covers the valve cavity and supports a yoke 10. A plug 12 is mounted within the valve cavity and its lower end carries a guide stem 14 which slidably fits the sleeve 6 and its upper end carries an operating stem 15 projecting upwardly through an opening in bonnet 8 which carries the usual packing gland 16, etc., to insure a fluid tight construction.

Mounted on the yoke 10 is the valve operating mechanism, the main parts of which are within a housing 20. This mechanism may comprise a two part cam assembly 21 and 22, the lower part being pinned or otherwise fixed to the upper end of the stem 15 and the upper part 22 being rigidly secured to the lower part 21 by screws or other suitable means. The two parts are formed with spaced, vertically aligned cam surfaces 25 and 26 similar to the so-called diagonal disk cam, and interposed between these surfaces is a cam member 28 secured to or integral with the lower end of a spindle 30 which is rotatably mounted at the upper part of the housing 20.

The cam surfaces 25 and 26 are formed with circumferential grooves which receive ball bearing elements 32 and 33 associated with the cam member 28, and the construction and arrangement of parts are such that when the spindle 30 is rotated in one direction or the other, the cam member 28 acts through ball bearings 33 and cam surface 26 first to lift or elevate the cam assembly and associated parts including the plug 12, and upon continued rotation the cam member 28 then acts through ball bearings 32 and cam surface 25 to retract or lower the stem and associated plug 12. Thus, the plug 12 is seated and unseated in response to a predetermined angular movement of the spindle 30 and it is to be understood that the axial movement of the plug will depend on the pitch of the cam surfaces which may be varied to give an axial movement of the order of a few thousandths of an inch in the case of a metal plug, to a quarter of an inch or more in the case of rubber lined plug.

The upper part of the housing 20 is formed with an off-set portion 35 which rotatably supports a stud 36 and secured to this stud is an inwardly extending recessed arm 38 having an elongate slot or recess 40 at its free end and a lug or finger 42 depending from its undersurface. Fixed to the spindle 30 above the recessed arm 38 is a lever arm 44 having at its free end a depending lug or finger 45 engageable with the recessed arm 38 when the spindle is rotated through an angle of approximately 120°, and then operative to rotate the arm 38 an angle of 90°, after which the lug 45 disengages the arm 38.

Below the recessed arm 38 is a slotted arm 48 the inner end of which is fixed to the part 22 so as to rotate the cam assembly and valve stem 15 when swung in either direction. The slotted portion of the arm 48 receives the lug 42 so that rotation of the arm 38 through an angle of 90° causes a corresponding rotation of the arm 48 and consequent opening and closing of the plug 12.

Figure 3:
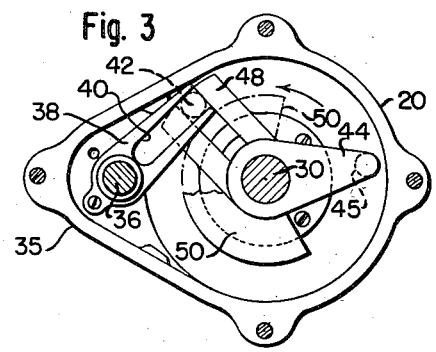
Fig. 3 is an enlarged section on the line 3—3 of Fig. 1.
Figure 4:
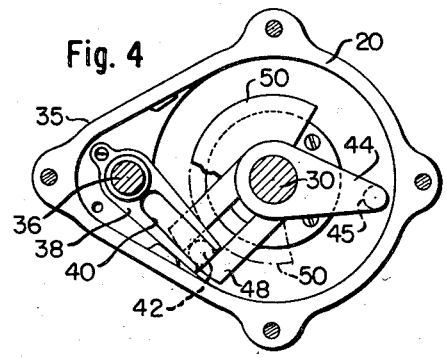
Fig. 4 is a view similar to Fig. 3 but showing the position of the operating mechanism when the valve is open.

In order to prevent the rotation of the arms 38 and 48 during axial movement of the stem 15, a sector plate 50 (shown partly broken away in Figs. 3 and 4) is secured to the spindle 30, the shape of the plate being such that its periphery is always in contact with one side of the recessed arm 38, except during the 90° movement of the arm 38 following the initial engagement of the lug 45 therewith. As shown by the dot and dash lines of Figs. 3 and 4, when the plug 12 is closed the plate 50 holds the arm 38 against clockwise rotation and when the plug is open the plate holds the arm 38 against counter-clockwise rotation, thus preventing accidental opening or closing of the plug 12.

Figure 2:
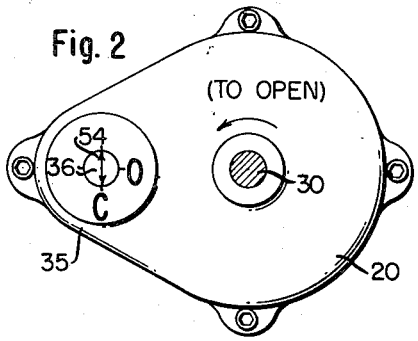
Fig. 2 is a section on the line 2—2 of Fig. 1.

The spindle 30 extends through an opening in the top of the housing 20 and is connected with a suitable operating member, here shown as a handwheel 52. In order to indicate the position of the plug 12, the upper end of the stud 36 may carry an arrow 54 or other appropriate indicator, as shown in Fig. 2.

Figure 5:
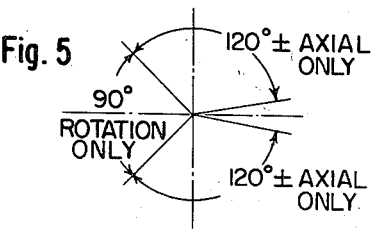
Fig. 5 is a diagram indicating the movements of the valve member for a complete operating cycle or movement of the handle or actuator.

A summary of the operation of the valve is as follows: Assuming that the parts are in the position shown in Figs. 1 to 4 with the plug closed and seated, rotation of the handwheel 52 in a counter-clockwise direction through an angle of approximately 120° first acts through the cam member 28 and the upper cam surface 26 to lift or unseat the plug 12, as indicated in Fig. 5. The 120° rotation also causes the sector plate 50 to disengage the side of the arm 38 and thus release it for rotary movement. Further rotation of the handwheel through an angle of 90° causes the lug 45 of arm 44 to swing the arm 38 clockwise through an angle of 90° to open the plug 12 and also arrest axial movement of the stem 15 since during this 90° movement there is no relative rotation between the stem 30 and spindle 15. Continued rotation of the handwheel 52 through an angle of approximately 120° disengages the lug 45 from the arm 38, thus permitting relative movement between the stem 15 and spindle 30 so that the cam member 28 acts on the cam surface 25 to effect a lowering or reseating of the plug 12. This 120° movement is also effective to bring the sector plate 50 in engagement with the side of the arm 38 to hold it against counter-clockwise movement. Thus, rotation of the handwheel 52 in a counter-clockwise direction through an angle of approximately 330° is effective first to lift or unseat the plug, then rotate it 90°, and finally lower or reseat it in open position, as indicated in Fig. 5; and movement of the handwheel in a clockwise direction is effective to reverse the above described operation, viz., the sequential unseating, 90° rotation and reseating of plug 12 in closed position.

While I have shown and described one desirable embodiment of the invention it is to be understood that this disclosure is for the purpose of illustration and that various changes and modifications may be made without departing from the spirit and scope of the invention as set forth in the appended claims.

I claim:

1. In a plug valve of the type having a valve member mounted on a stem for axial and rotary movements and a rotary operating member, actuating mechanism connecting the operating and valve members comprising a rotary spindle coaxial with said stem and connected to said operating member, means carried by the upper end of said stem and the lower end of said spindle and arranged so that a predetermined rotary movement of said operating member is effective first to move said stem axially in one direction and then move said stem axially in the opposite direction, a housing disposed about said spindle between said stem and operating member, a first member projecting from said spindle, a second member pivotally mounted on said housing so as to be engaged and rotated by said first member when the latter is swung through a predetermined angle, a third member having a connection with said stem effective to rotate said valve member when swung from one position to another, and interengaging parts carried by the second and third member operative to rotate the third member when the second member is rotated by the first member, the construction and arrangement of parts being such that a predetermined rotary movement of said operating member first moves said stem axially in one direction, then rotates said stem through a predetermined angle, and finally moves said stem axially in the opposite direction.

2. In a plug valve of the type having a valve member mounted on a stem for axial and rotary movements and a rotary operating member, actuating mechanism connecting the operating and valve members comprising a rotary spindle coaxial with said stem and connected to said operating member, cooperating cam elements carried by the upper end of said stem and the lower end of said spindle and arranged so that a predetermined rotary movement of said operating member is effective first to move said stem axially in one direction and then move said stem axially in the opposite direction, a housing disposed about said spindle between said stem and operating member, a first member secured to said spindle, a second member pivotally mounted on said housing so as to be engaged and rotated by the first member when the operating member is swung through a predetermined angle, an operating arm having a connection with said stem effective to rotate said valve member when swung from one position to another, interengaging parts carried by said operating arm and second member effective to rotate said operating arm when said second member is rotated by said first member, the construction and arrangement of parts being such that a predetermined rotary movement of said operating member first moves said stem axially in one direction, then rotates said stem through a predetermined angle, and finally moves said stem axially in the opposite direction.

3. In a plug valve of the type having a valve member mounted on a stem for axial and rotary movements and a rotary operating member, actuating mechanism connecting the operating and valve members comprising a rotary spindle coaxial with said stem and connected to said operating member, cooperating cam elements carried by the upper end of said stem and the lower end of said spindle and arranged so that a predetermined rotary movement of said operating member is effective first to move said stem axially in one direction and then move said stem axially in the opposite direction, a housing disposed about said spindle between said stem and operating member, a lever arm secured to said spindle, a recessed arm pivotally mounted on said housing so as to be engaged and rotated by the free end of said lever arm when the operating member is swung through a predetermined angle, a slotted arm below said recessed arm having a connection with said stem effective to rotate said valve member when swung from one position to another, and a depending lug carried by said recessed arm and arranged to project into the slot in said slotted arm so as to rotate the latter when said recessed arm is rotated by said lever arm, the construction and arrangement of parts being such that a predetermined rotary movement of said operating member first moves said stem axially in one direction, then rotates said stem through a predetermined angle, and finally moves said stem axially in the opposite direction.

4. A plug valve as set forth in claim 1, wherein means are provided to lock said second member against rotary movement during axial movement of said stem.

5. A plug valve as set forth in claim 3, wherein said spindle carries a sector plate operative to lock said recessed arm against rotary movement during axial movement of said stem.

References Cited in the file of this patent

UNITED STATES PATENTS

| | | |
|---|---|---|
| 912,890 | Roberts | Feb. 16, 1909 |
| 2,327,425 | Hilker | Aug. 24, 1943 |
| 2,459,682 | Carrie | Jan. 18, 1949 |